(12) United States Patent
Bayer et al.

(10) Patent No.: US 12,545,105 B2
(45) Date of Patent: Feb. 10, 2026

(54) MODULAR MICROCONTROLLER ARCHITECTURE

(71) Applicant: Rivian IP Holdings, LLC, Irvine, CA (US)

(72) Inventors: Joshua Bayer, Costa Mesa, CA (US); Kevin Dean Kline, Mission Viejo, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 228 days.

(21) Appl. No.: 18/478,244

(22) Filed: Sep. 29, 2023

(65) Prior Publication Data

US 2025/0108857 A1   Apr. 3, 2025

(51) Int. Cl.
| | |
|---|---|
| *B60K 35/10* | (2024.01) |
| *B60K 35/00* | (2024.01) |
| *B60K 35/22* | (2024.01) |
| *B60K 35/28* | (2024.01) |
| *B60K 35/60* | (2024.01) |
| *B60K 35/80* | (2024.01) |
| *B62D 5/04* | (2006.01) |

(52) U.S. Cl.
CPC .............. *B60K 35/10* (2024.01); *B60K 35/00* (2013.01); *B60K 35/60* (2024.01); *B60K 35/80* (2024.01); *B62D 5/046* (2013.01); *B60K 35/22* (2024.01); *B60K 35/28* (2024.01); *B60K 2360/16* (2024.01)

(58) Field of Classification Search
CPC ...... B62D 5/046; B62D 63/025; B60K 35/00; B60K 35/10; B60K 35/22; B60K 35/28; B60K 35/60; B60K 35/80; B60K 2360/16
See application file for complete search history.

(56) References Cited

U.S. PATENT DOCUMENTS

| | | | |
|---|---|---|---|
| 11,683,693 B1* | 6/2023 | Bayer | G06F 8/65 455/41.2 |
| 2003/0038467 A1* | 2/2003 | Chernoff | B60N 2/14 280/781 |
| 2008/0284678 A1* | 11/2008 | Randel | B60K 35/22 345/55 |
| 2011/0072123 A1* | 3/2011 | Hsu | B60K 35/22 709/223 |
| 2015/0134199 A1* | 5/2015 | Fraser-Chanpong | B60W 10/00 701/36 |
| 2017/0267285 A1* | 9/2017 | Abbas | B60R 21/16 |
| 2018/0345971 A1* | 12/2018 | Birnschein | B62D 21/152 |
| 2020/0148144 A1* | 5/2020 | Shiomi | B60R 16/033 |
| 2021/0101613 A1* | 4/2021 | Claesson | B60K 7/0007 |
| 2021/0229701 A1* | 7/2021 | Claesson | B60W 50/032 |
| 2021/0297430 A1* | 9/2021 | Oguchi | H04L 63/1416 |

(Continued)

Primary Examiner — John M Zaleskas
(74) Attorney, Agent, or Firm — Foley & Lardner LLP

(57) ABSTRACT

A modular control system is provided. The system can include a modular control system configured to connect to a vehicle control system of a base vehicle. The modular control system can include a main body controller connected, via a first link, with the vehicle control system. The modular control system can include a display controller connected with the main body controller. The main body controller can receive a first trigger, over the first link, indicative of a condition of the base vehicle. The main body controller can convey, via the display controller, an output of the condition to a display.

19 Claims, 10 Drawing Sheets

(56) References Cited

U.S. PATENT DOCUMENTS

| | | | | |
|---|---|---|---|---|
| 2022/0266776 A1* | 8/2022 | Kurokawa | .............. | B60R 21/01 |
| 2022/0289249 A1* | 9/2022 | Imai | ................. | B60W 60/0059 |
| 2022/0297617 A1* | 9/2022 | Kurokawa | .............. | H04L 67/12 |
| 2022/0379828 A1* | 12/2022 | Shiomi | ................... | B60R 16/02 |
| 2024/0208517 A1* | 6/2024 | Kono | ................. | B60W 10/184 |
| 2024/0380820 A1* | 11/2024 | Yamada | ................. | B60R 16/02 |
| 2024/0424855 A1* | 12/2024 | Oguri | ................ | H05K 7/20863 |

\* cited by examiner

| | 1 | 0 | 0001_XXXX | 0010_XXXX | 0110_XXXX |
|---|---|---|---|---|---|
| 120 | Engage Hazard Indicators | Disengage Hazard Indicators | -- | -- | Set Vehicle Mode |
| 116 | -- | -- | Set Lamp Brightness | Forward Message | -- |
| 114 | -- | -- | -- | Forward Message | -- |

FIG. 6

MODULAR MICROCONTROLLER ARCHITECTURE

INTRODUCTION

Vehicles can include various controllers to interface with auxiliary components. The controllers can be in network communication to effect vehicle operation.

SUMMARY

This technical solution is generally directed to a modular controller architecture for vehicles, such as electric vehicles. For example, the electric vehicle can be a demonstration vehicle, test mule, design concept, or other non-serial production vehicle which is iterated upon incident to vehicle design or presentation. The electric vehicle can include a base vehicle and a development platform portion interfacing therewith (e.g., overlayed thereover). The base vehicle can include control circuitry for vehicle propulsion or other systems such as steering, braking, battery management, motor control, traction control, or so forth. The development platform can include an overlay over the base vehicle to control various portions thereof. For example, the overlay can include controls for audio devices, wipers, seat controls, a center information display (CID), or instrument cluster display (ICD). The control system of the overlay of the development platform can be configured to interface with the various components of the overlay platform, along with the base vehicle. For example, some controls of the overlay can cause operation of the base vehicle (e.g., an actuation of a traction control system via a selection of the CID may effect a drive current provided to a drive unit). Some operations of the base vehicle can cause an actuation of the overlay (e.g., a vehicle speed may be displayed upon the ICD, or various overlay functions such as door locks or drive mode selections may vary according to a vehicle state).

At least one aspect is directed to a system. The system can include a modular control system configured to connect to a vehicle control system of a base vehicle. The modular control system can include a main body controller connected, via a first link, with the vehicle control system. The modular control system can include a display controller connected with the main body controller. The main body controller can receive a first trigger, over the first link, indicative of a condition of the base vehicle. The main body controller can convey, via the display controller, an output of the condition to a display.

At least one aspect is directed to a method. The method can be performed by one or more controllers, coupled with memory, of a vehicle, such as a first controller. The method can include receiving, via a first link by a main body controller of a modular control system configured to connect to a vehicle control system of a base vehicle, a first trigger indicative of a condition of the base vehicle. The method can include conveying, by the main body controller via a display controller of the modular control system, an output of the condition to a display.

At least one aspect is directed to an electric vehicle. The electric vehicle can include a vehicle control system of a base vehicle. The electric vehicle can include a modular control system configured to connect to the vehicle control system of the base vehicle. Either of the modular control system or the vehicle control system of the base vehicle can include various controllers coupled to memory. The modular control system can include a main body controller connected, via a first link, with the vehicle control system. The modular control system can include a display controller connected with the main body controller The main body controller can receive a first trigger, over the first link, indicative of a condition of the base vehicle. The main body controller can convey, via the display controller, an output of the condition to a display.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 6 is an example look up table (LUT) for vehicle control.

DETAILED DESCRIPTION

Figure 1:
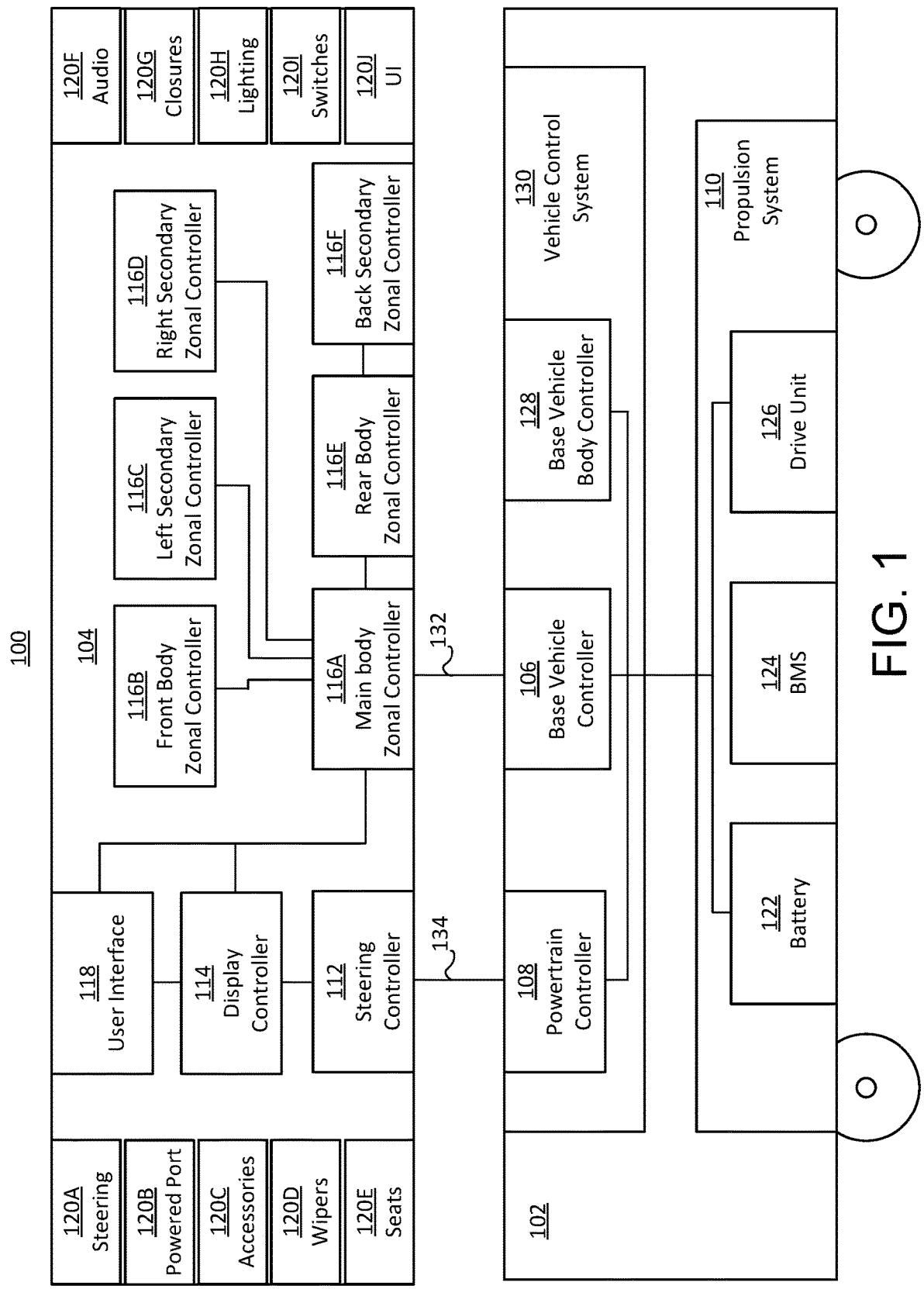
FIG. 1 depicts an example vehicle control system including a base vehicle portion, and an overlay portion.

Following below are more detailed descriptions of various concepts related to, and implementations of, methods, apparatuses, and systems of modular microcontroller architectures. The various concepts introduced above and discussed in greater detail below may be implemented in any of numerous ways.

This technical solution is generally directed to modular control systems configured to interface with a vehicle control system of a base vehicle. The modular control systems may be included in or referred to as an overlay. The overlay can operate or include various vehicle components such as audio devices, wipers, seat controls, a center information display (CID), instrument cluster display (ICD), etc. The overlay can interface with components of a base vehicle to cause an operation of the vehicle, such as propulsion, charging, or steering. For example, the overlay can display information received from the base vehicle on a graphical display, or actuate various chimes, alarms, lights, speed sensitive audio adjustments, or so forth, responsive to information received from the base vehicle. The overlay can couple to various components of the vehicle via a vehicle control system of the base vehicle.

In an illustrative example, the overlay can include various controllers, such as zonal controllers to interface with a portion of a base vehicle (e.g., an approximate physical zone, such as a front or a back). A portion of the controllers can be multiple instances of a same hardware design or circuit. For example, each of a gateway and various other controllers can include a same microcontroller circuit. The controllers can interface with various vehicle auxiliary components over data links including general purpose input or outputs (GPIOs), controller area networks (CAN) or local interconnect networks (LIN), or other serial ports (e.g., universal synchronous/asynchronous receiver/transmitter (UART/USART)). The auxiliary components can include or refer to integral components of a vehicle or other components connected to the vehicle (e.g., accessory components). A further controller (e.g., a different controller type than the other controllers) can cause a presentation of one or more graphical user interfaces, such as a center information display (CID) or instrument cluster display (ICD), along with one or more touchscreens (e.g., corresponding to the CID). Some vehicle auxiliary components can include level shifters, motor drivers, protection circuits, or other signal translators to engage or receive input from the vehicle auxiliary components (e.g., a CMOS driver board). For example, a same interface circuit of various instances of interface devices can interface with various auxiliary components of a vehicle.

One of the controllers can act as a gateway for others of the controllers. The gateway can interface with a controller of the base vehicle, such as a vehicle controller operatively coupled to a propulsion or other drive system. The gateway can cause the vehicle to operate in a first mode, whereupon various user inputs can cause the operation of the propulsion or other drive system. The gateway can cause the vehicle to operate in a second mode, whereupon the drive systems may be inoperable, or otherwise restrict vehicle operation (e.g., for an auto show mode of operation, where a speed is limited to, for example, three miles per hour, or a disengagement of a brake is inhibited).

The disclosed solutions have a technical advantage of decoupling the base vehicle from a development platform for another vehicle portion. For example, such decoupling of an overlay may reduce or eliminate special purpose development of production components, such as a motor controller to provide an indication of a detection of a surface corresponding to a drive mode, where the vehicle is halted. Moreover, the decoupling can allow for the employment of various components, such as processors, radios, and the like which are not suited to a production environment (e.g., devices which may not conform to reliability, thermal, environmental, data logging, or other parameters). Thus, the development of a user experience or user interface of a vehicle can be conducted on development hardware which can be iterated upon quickly. Further, user experience designers can operate with a lesser or different toolset (e.g., integrated development environments, (IDE)) than that of at least a portion of the base vehicle (e.g., by using various instances of a same microcontroller system). Further, such a system can be portable between vehicles or projects, such that any changes, logging, configurations, or so forth may be consistent between development vehicles, even where the production vehicles omit such features, or make other changes (e.g., updates to newer controllers, controllers of a different architectures, etc.).

FIG. 1 depicts an example system 100 including a base vehicle 102 portion, and an overlay portion including various elements of a modular control system 104. The modular control system 104 is communicatively coupled to the base vehicle portion 102, also referred to as the base vehicle 102, over one or more links. The base vehicle 102 can include a vehicle control system 130 configured to control (e.g., monitor or actuate) a propulsion system 110. For example, the vehicle control system 130 can include a base vehicle controller 106 in network communication with one or more controllers of the modular control system 104. For example, the base vehicle controller 106 can connect to a controller of the overlay such as a main body zonal controller 116A over a first link 132.

A steering device 120A, powered port 120B, other accessory 120C, windshield wiper motor 120D, seat control or feature 120E, audio device 120F, closure 120G or sensor therefor, lighting element 120H, switch 120I or other user interface 120J, can be referred to, along with other components, as an auxiliary component 120. Various auxiliary components 120 connected to the modular control system 104 can be disposed within the base vehicle 102, or the overlay. For example, the windshield wiper motor 120D can be a windshield wiper motor 120D of a base vehicle 102, or an updated windshield wiper motor 120D of an overlay. Connections between the various controllers such as the main body zonal controller 116A, front body zonal controller 116B, left secondary zonal controller 116C, right secondary zonal controller 116D, rear body zonal controller 116E, or back secondary zonal controller 116F (any of which may be collectively or individually referred to as a zonal controller 116) and the various auxiliary components 120 are omitted, for clarity of the drawing. Further, some overlays can include additional or fewer zonal controllers 116, according to a number or connectivity of various auxiliary components 120, a desired software reuse or commonality with another instance of the overlay, or so forth.

The base vehicle controller 106 may be in network communication with various further controllers of the base vehicle 102, such as a body controller, or a propulsion system 110 via a powertrain controller 108. The powertrain controller 108 can control various operations of the base vehicle 102 involving the application of power, such as a current supplied to the drive unit 126, an operation of a traction control system (e.g., vehicle dynamics module), vehicle steering, or other base vehicle functions. The powertrain controller 108 can connect to a steering controller 112 to receive, for example, a steering angle sensor (SAS) of a steering wheel. The powertrain controller 108 can receive the SAS over a second link 134, different from the first link 132. For example, the second link 134 can be or include a link between a powertrain controller 108 of a base vehicle 102 with a steering controller 112 which is similar or identical to a steering controller 112 of a base vehicle, at least with respect to the second link 134. For example, the steering controller can re-use hardware or software components from a base vehicle 102 to reduce changes. Such an implementation can reduce impact to a powertrain controller 108.

The propulsion system 110 can include or interface with various subsystems of the base vehicle 102. For example, the propulsion system 110 can include a battery subsystem including a battery management controller, a battery 122, a charging system, a battery monitoring system, steering system, or a thermal management system. The propulsion system 110 can include a drive unit 126 subsystem including drive units 126 (e.g., electric motors and inverters), braking subsystem, or a body control subsystem. The propulsion system 110 can interact with various controllers of the base vehicle 102, such as a base vehicle body controller 128. The various systems of the base vehicle 102 can be in network communication with one another. For example, the drive unit 126 subsystem, the battery management controller 124, and the braking system may be in network communication to apportion braking force between regenerative and frictional braking. Such networks can include, for example, any combination of controller area network (CAN), local area network (LIN), Ethernet, serial, discrete, or other direct or indirect interfaces such that the various devices can effect a flow of information therebetween. The propulsion system 110 can include, for example, a controller to drive the various inverters, or a controller to actuate components of a frictional braking system, a controller to actuate tie-rods responsive to a signal received from a steering controller 112 (e.g., to match a steering angle of a SAS of a steering wheel).

The various components of the base vehicle 102 can be a subset of a vehicle control system 130 for other applications, such as a subset of a vehicle control system 130 for a production vehicle. Such components can be configured to interface with a vehicle control system 130 other than the modular control system 104. For example, the base vehicle 102 can be a portion of a validated assembly, wherein the modular control system 104 is substituted for a portion of the validated assembly. Such implementations can decouple development of, for example, various cabin features, from base vehicle 102 components such that development or presentation of features such as vanity mirrors and door locking mechanisms can proceed parallel to or in advance of development of a corresponding base vehicle 102. The base vehicle 102 features can vary according to various implementations of the present disclosure. That is, the base vehicle 102 can include additional, fewer, or different components.

The modular control system 104 can be part of, hosted by, or otherwise integrated into an electric vehicle. The modular control system 104 can include or interface with at least one steering controller 112 to determine a steering angle based on a user input of a user interface 118 device (e.g., steering wheel) or autonomous controller. The modular control system 104 can include or interface with at least one display controller 114 to present a display, such as a display configured for presentation to an occupant of the electric vehicle (e.g., an CID or ICD). The modular control system 104 can include or interface with at least one zonal controller 116 to interface with various auxiliary components 120, or to convey information between the base vehicle 102 and the modular control system 104. The modular control system 104 can include or interface with at least one user interface 118 to exchange information or commands between the system 100 and a user, such as an occupant of the electric vehicle.

The steering controller 112, display controller 114, zonal controllers 116, or user interface 118, or the various components of the base vehicle 102, can be or include a processing unit or other logic device such as programmable logic array engine. The steering controller 112, display controller 114, zonal controllers 116, or user interface 118 can be part of the electric vehicle (e.g., the modular control system 104 thereof), and can include or interface with other components of the electric vehicle. The system 100 can include hardware elements, such as one or more processors, logic devices, or circuits. For example, the various components of the base vehicle 102 or the overlay can include one or more components or structures of functionality of controllers depicted in FIG. 10. The various components of the system 100 can be in network communication via a CAN, Ethernet, or any number of other wired or wireless networks.

The various messages herein can be referred to as signals, input, or outputs, without limiting effect. That is, each signal or message can be referred to as an output of a transmitter, or an input of one or more receivers. Messages to multiple receivers may include broadcast messages, or a set of individually addressed messages.

The steering controller 112 can include sensors designed, constructed, or operational to determine a position of a user interface device such as a steering wheel, or a control input received from an autonomy system. For example, the steering controller 112 can include or interface with a steering angle sensor (SAS) to determine a signal corresponding to a mechanical rotation of the wheel (e.g., a potentiometer to detect a position-based resistance, a hall effect sensor to detect a location of a magnetic element, or an electromechanical resolver to determine an angle). The steering controller 112 can be or include at least a portion of a steering controller 112 of the base vehicle 102. For example, the steering controller 112 can interface with the base vehicle 102 portion (e.g., the powertrain controller 108 thereof) via a same interface as in the base vehicle 102 lacking a modular control system 104.

The steering controller 112 can be a steering column controller, which can receive an indication of the steering angle, along with various user interface 118 devices disposed on or adjacent to the steering wheel. For example, audio controls, turn signal controls, horn controls, or other user interface elements can be connected to the steering controller 112 (e.g., can be auxiliary components 120 thereof). A controller of the modular control system 104, such as the display controller 114 can receive signals of the steering angle, or other signals (e.g., turn signal indications or audio inputs) for provision to other components of the modular control system 104. That is, the display controller 114 can operate as a gateway device for the steering controller 112.

The display controller 114 can be designed, constructed, or operational to interface with various user interface elements. For example, the display controller 114 can interface with displays of a graphical user interface, along with buttons, touchscreen, or other user interface 118 devices (e.g., auxiliary components 120). For example, the display controller 114 can include one or more video outputs, such as a first output for in ICD and a second output for a CID of the electric vehicle. The display controller 114 can generate images for the display which are configured to correspond to a vehicle operation which may or may not correspond to a current state of a vehicle. For example, the display controller 114 can cause a presentation of a speed which differs from an actual speed of the electric vehicle, or depict an operation of a feature which is geofenced, speed restricted, or activated in response to a stimulus which is absent (e.g., wheel slip). That is, the display controller 114 can cause a display corresponding to simulated activity. The display controller 114 can determine the simulated activity based on a predefined sequence, or in real-time responsive to various inputs. For example, the display controller 114 can repeat a predefined sequence in a demonstration mode, or provide responses to inputs in a development environment. The display controller 114 can provide a video from, for example, a front facing or rear facing camera, a pre-recorded video, or so forth, responsive to placing the vehicle into a reverse gear. The input can be received from a zonal controller 116 associated with the auxiliary device 120 or the main body zonal controller 116A, based on a trigger received from the base vehicle 102. An input or output may refer to a signal with reference to one or more controllers, such as a zonal controller 116. Such signals may also be referred to as triggers, with reference to a consequence of the signal. For example, upon a receipt of an input, on a CID or by a pushbutton, a zonal controller 116 can illuminate a map-light. For example, the zonal controller can directly receive the pushbutton input, receive the pushbutton input from another zonal controller 116, or receive the CID selection from the display controller 114 (e.g., directly or via another controller). The actual actuation of the pushbutton or ICD, or one or more signals indicative thereof may be referred to as a trigger (e.g., a trigger for map-light operation).

Some inputs to the display controller 114 can be from or associated with the steering controller 112. For example, the display controller 114 can cause a display of a turn signal indication, on the ICD, responsive to a receipt of a message from the steering controller 112 indicating an actuation of the turn signal stalk input element 304 or other input. The display controller 114 can provide an indication to any controller responsive to a receipt of a message from another controller. For example, the display controller 114 can provide an output to various zonal controllers 116 to activate a corresponding auxiliary component 120 such as a turn signal indicator lamp (e.g., a rear body zonal controller 116E for a rear turn signal) responsive to the receipt of the turn signal indication (e.g., from the steering controller 112). The display controller 114 can actuate an auxiliary component 120 connected thereto. For example, the display controller 114 can engage an audio component of an ICD or CID to cause an enunciation of a turn signal indicator sound via an audio device 120F.

The display controller 114 can present a display (e.g., an audiovisual display including a presentation of a GUI or audio presentation) based on a combination of simulated activity or inputs received via various portions of the user interface 118. For example, the display controller 114 can provide a depiction of a navigation of a predefined route including any of a vehicle speed, a global navigation satellite system (GNNS) location, a vehicle attitude, or a vehicle traction level. The display controller 114 can provide, along with the predefined route, an indication of user inputs. For example, the display controller 114 can present an indication of a response to a detection of an ajar door, a selection of an alternative display mode, or a disengagement of a traction control system.

The display controller 114 can select between instances of data. For example, the display controller 114 can receive, from a zonal controller 116, an indication from a battery management system (BMS) 124 of a battery state of charge (SoC) of 60%. The display controller 114 can receive a second, different indication of a SoC of 5% from a real-time or predefined source of simulated data. According to an operating mode, the display controller 114 can select between the data sources. Some functions can be selected based on different data sources. For example, a first function (e.g., a presentation of a display associated with low state of charge) may be presented based on the simulated data; a second function (e.g., a total power draw limit applied to auxiliary components 120 of the vehicle) can be based on the BMS 124 indicated SoC.

The zonal controllers 116 can be designed, constructed, or operational to interface with each other and with various vehicle auxiliary components 120 of the overlay. For example, the zonal controllers 116 can be networked or arrayed according to a full or partial mesh topology, a star topology, or an extended star topology. As depicted, the extended star topology includes the main body controller 116A at the hub of the star, and connects to a controller of the base vehicle 102 (e.g., a central gateway module of the base vehicle 102). The other zonal controllers 116 (e.g., the 'points' of the star) may be referred to as terminal zonal controllers 116. For example, the depicted terminal zonal controllers 116 can include a front body controller 116B, left secondary zonal controller 116C, and right secondary zonal controller 116D. A rear body zonal controller 116E is shown connected to the main body zonal controller 116A. Such a topology can be extended by connecting a new terminal zonal controller 116 to any depicted zonal controller 116 other than the hub, such as the depicted back secondary zonal controller 116F. The back secondary zonal controller 116F can operate, with regard to the connected rear body zonal controller 116E, as a terminal zonal controller 116. The rear body zonal controller 116E can operate, with regard to the back secondary zonal controller 116F, as a hub, and with regard to the hub as a terminal zonal controller 116. The display controller 114 or steering controller 112 can interface with the zonal controllers 116 or each other according to one or more connections. The various communications described herein can be initiated by any of the controllers. That is, information can be pushed or pulled from any of the controllers. References to a zonal controller 116 can refer to any of the zonal controllers 116 described herein, or to additional, substituted, or modified zonal controllers 116.

The zonal controller 116 can include multiple instances of a same microcontroller or hardware circuit. For example, the zonal controller 116 can be or include a controller board including the same microcontroller, discrete inputs or outputs (DIO), CAN, UARTS, or other serial ports. The function of the zonal controllers 116 can vary according to a strapping or pinning, a configuration file, or so forth. The zonal controller 116 can include or omit an enclosure, which may be configured to pass one or more connections through, including an optical passage for light emitting diodes (LEDs) (e.g., to provide a status of the zonal controller 116). The zonal controller 116 can include ports configured to operate at a voltage of an automotive control system (e.g., 12 volts, or 24 volts), transistor-to transistor (TTL) or other voltage levels. Any of the interfaces of the zonal controllers 116 can be configured to communicate with one or more auxiliary components 120 of the overlay, or another zonal controller 116.

One or more interfaces of the zonal controller 116 can be configured to connect to auxiliary components 120 of the overlay via an intermediate interface device. For example, the interface device can include a bidirectional controller, such as a common design to interface with various components. The interface device can be implemented as a board including outputs configured to drive seat motors, high power LEDs, or other components. For example, the interface devices can include outputs with power to drive such motors (e.g., based on a 12V, 24V, or 48V electrical system), along with a wetting current to reduce contact oxidation.

The zonal controllers 116 can be disposed throughout the overlay, based on a physical dimension thereof, which may reduce wiring length and weight, ease diagnostics, enable A/B testing (e.g., where a right and left half of a vehicle operate differently to enable a user to compare operation), and so forth. Such disposition is not intended to be limiting, and indeed, for some vehicle subsystems, function-based control, or other control schemes may be implemented by the zonal controllers 116. Further, the zones of the zonal controllers 116 can include overlapping portions, according to, for example, wire routing, data structure complexity, available ports, or electrical isolation.

The zonal controllers 116 can include a look up table (LUT) or other data structure mapping a predefined set of inputs to a predefined set of outputs. For example, the data structure can include a correlation between one or more auxiliary components 120 connected to the zonal controller 116. The zonal controller 116 can receive a state of an auxiliary component 120. Based on the state, the zonal controller 116 can determine (e.g., locally) an action associated with the state, or another controller associated with the state. Responsive to the determination, the zonal controller 116 can provide an output to actuate or otherwise control an action of another auxiliary component 120, or provide an indication to another controller so as to facilitate control by the zonal controller. The other controller may, in turn, control (e.g., monitor or actuate) an action of another auxiliary component 120. For example, a zonal controller 116 may be connected to two auxiliary components 120 of a switch input and a light output, respectively. The zonal controller 116 can receive a state or a change in state (e.g., a momentary press) of the switch input, compare the value of the switch input to an entry of the data structure, determine that the switch state corresponds to a light being on, and output a signal to cause the light to turn on.

Some entries of the data structure can correspond to additional auxiliary components 120. For example, the zonal controller 116 can engage two lights, or a light and a chime responsive to the receipt of the input from the switch 120I. Continuing the example, the zonal controller 116 can engage the switch 120I responsive to a logical combination of elements, such as a logical ORing of the state of the switch 120I with a state of an indication of an ajar door indicator, a state of an input from a CID (e.g., received from the display controller 114), or other elements. Such logical functions can be employed, without limitation, based on any combination of inputs received from various other controllers, auxiliary components 120, locally maintained states, timers, or other information available to the zonal controller 116.

The data structure can include a correlation between one or more auxiliary components 120 and another of the zonal controllers 116. For example, any of the inputs received from another controller, such as a steering controller 112, a display controller 114, or another zonal controller 116 can be responsive to an actuation or state of an auxiliary component 120 connected thereto. The data structure can include a correlation between one or more zonal controllers 116 and another of the zonal controllers 116. For example, a zonal controller 116 can generate a signal for conveyance to another controller based on the locally maintained states, timers, or other information available to the zonal controller 116.

At least one controller, such as a zonal controller 116 can interface with a base vehicle controller 106 over a link 132 therebetween (e.g., can be connected to the vehicle control system 130 of the base vehicle 102). The controller connected to the link 132 may be referred to as a gateway controller, bridge controller, or so forth. For example, the controller can connect to various other controllers, such as various (other) zonal controllers 116, or the display controller 114. The bridge controller can receive a message associated with a propulsion system 110 of the base vehicle 102 from another controller, such as a message from the vehicle control system 130 of the base vehicle 102 or another controller of the modular control system 104. The bridge controller can provide a message to the display controller 114 to cause the display controller 114 to display an indication of the message, or to a zonal controller 116 to actuate or otherwise control an auxiliary component 120. For example, the display controller 114 can present a display on a CID or ICD (e.g., an indication of low battery SoC).

The bridge controller can determine a state of the base vehicle 102. For example, the bridge controller can receive (e.g., intercept, scrape, or monitor) various messages of a vehicle control system 130 of the base vehicle 102 over a link 132. Such a receipt can include detecting a message from one device of the base vehicle 102 addressed to another device of the base vehicle 102 over the link 132, or can include another interface, such as a dedicated link 132 with the base vehicle controller 106. The bridge controller can extract a state of the propulsion system 110 from the message. The bridge controller can provide (e.g., via the display controller 114) an indication of the state of the propulsion system 110 (or other base vehicle component) to a graphical user interface. The bridge controller can present an output to an auxiliary component 120 based on the state of the propulsion system (e.g., an auxiliary component 120 which is directly connected or otherwise in network communication with the bridge controller).

The bridge controller can implement various modes of operation, based on an indication received from a user interface 118 such as an auxiliary component 120 configured to provide an indication to the controller or a touchscreen associated with a display. The mode of operation can limit a battery SoC, a propulsion of a vehicle via a drive unit 126 or braking system, or otherwise modulate a base vehicle 102 operation. The bridge controller can effect the propulsion restriction by, for example, an explicit command to the powertrain controller 108, by selectively passing other inputs based on the mode indication (e.g., by not conveying propulsion commands to the base vehicle 102, or by reporting (e.g., simulating) a condition to prevent propulsion (e.g., an airbag deployment, thermal event, or connection of a charging cable).

Some modular control systems 104 can include more than one controller interfacing with one or more controllers of the base vehicle 102. For example, a modular control system 104 can include a second link via the steering controller 112 for some elements of a user interface 118 (e.g., the buttons and switches 120I associated with a steering wheel), and the first link 132 for other auxiliary components 120, through an instance of a zonal controller 116. Such an example is merely illustrative, and additional or fewer links may be present in some systems 100.

The steering controller 112 or display controller 114 or can perform any of the various actions described with respect to the zonal controllers 116. For example, the steering controller 112 or display controller 114 can convey a message to a zonal controller 116 or each other based on an input received from another of the steering controller 112, display controller 114, or zonal controller 116. The steering controller 112 or display controller 114 can actuate a connected auxiliary component 120 based on an input from another auxiliary component 120. The steering controller 112 or display controller 114 can actuate a connected auxiliary component 120 based on an input from a zonal controller 116, or convey a message to a zonal controller 116 based on an input received from an auxiliary component 120.

The user interface 118 can be designed, constructed, or operational to interface with a user, via one or more user interface elements. For example, the user interface elements can include a steering wheel or related controls (e.g., turn signal stalk input element, cruise control settings, or horn). The user interface 118 can include various auxiliary components 120, such as vehicle seat weight sensors or position sensors, ignition switches 120I, light switches 120I, door ajar positions, light sensors (e.g., related to automatic headlights), moisture sensors (e.g., related to automatic wipers), window controls, side view mirror adjustments, rear seat inputs (e.g., HVAC) inputs, and other controls configured to receive input from a user.

The user interface 118 can include a display configured to provide a graphical or textual output to a user, such as the ICD or CID. The user interface 118 can include a touchscreen of a display (e.g., the CID) configured to receive information from the user. The user interface 118 can include various wireless devices configured to interface with the electric vehicle, the wireless device including key fobs, mobile phones, or other wireless devices. The various user interface elements such as inputs (e.g., buttons, switches 120I, touchscreens, or sensors) or outputs (e.g., lights, displays, motors, or speakers) can be referred to, generally, as auxiliary components 120. Such auxiliary devices can be controlled (e.g., monitored or actuated) by various controllers of the present disclosure. Such devices can include, for example, the powered port 120B, a windshield wiper motor 120D, a seat control, an indicator lamp, an audio device, a user interface element, the closure 120G (e.g., to open and close a charger port) or a sensor for a closure 120G (e.g., to detect an ajar door).

Figure 2:
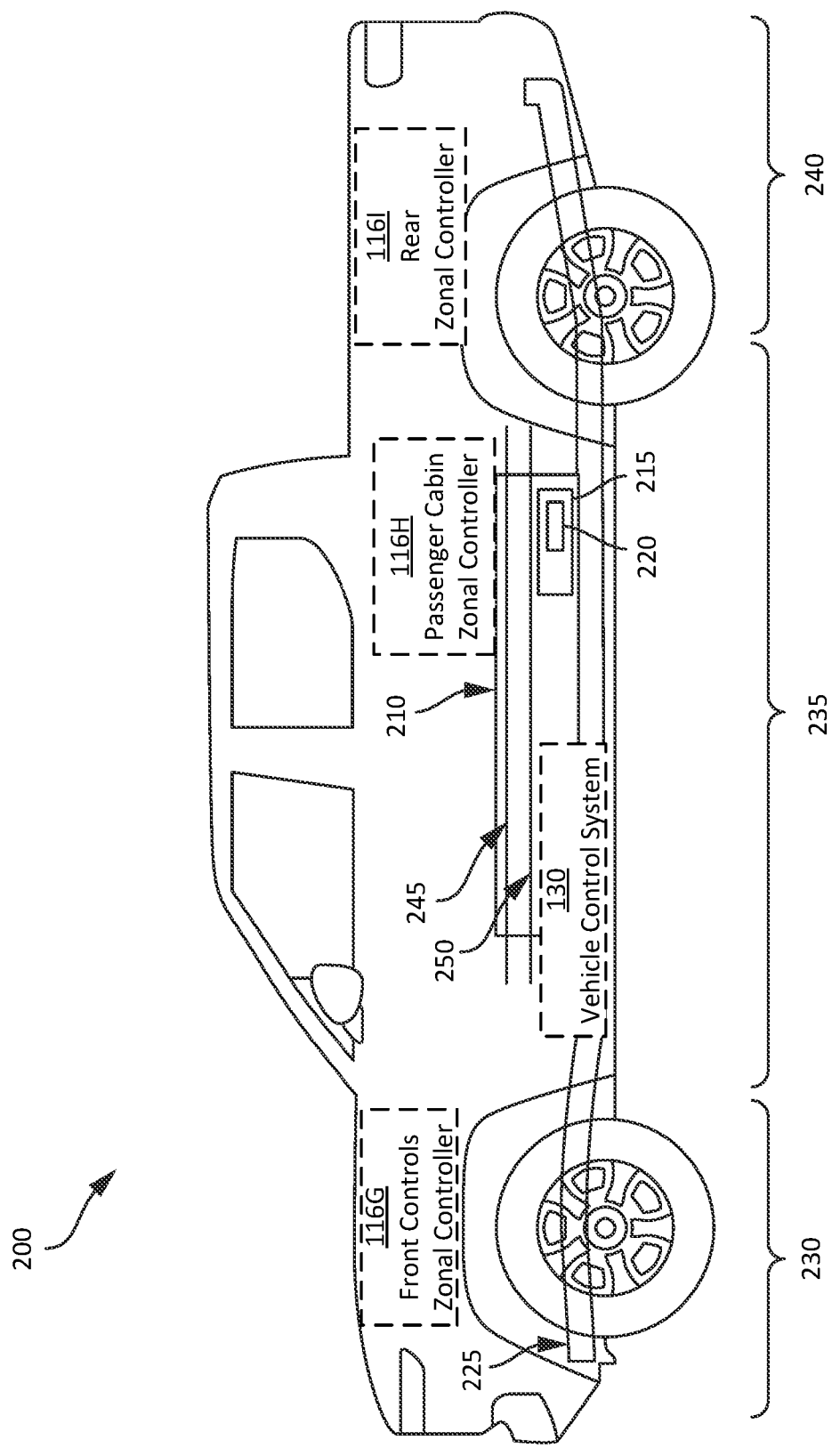
FIG. 2 depicts an example electric vehicle.

FIG. 2 depicts an example cross-sectional view of an electric vehicle 200. The electric vehicle 200 can include a vehicle control system 130 and various components of a base vehicle 102, along with a modular control system 104 and various other components of an overlay. For example, the electric vehicle 200 can be a demonstration, development, or show vehicle. That is, the electric vehicle 200 can include an overlay portion to demonstrate features such as user interface elements, navigation screens, or drive mode selections. Other vehicle functions, such as electric motors or battery packs 210 may not be intended for show, demonstration, or development. Thus, the base vehicle portion 102 can include such functions, for example, by employment of a previously validated or released vehicle (e.g., a serial production vehicle). The modular control system 104 can interface between portions of the serial produced vehicle with the development or show overlay. The modular control system 104 can include zonal controllers 116 configured to operate zones of the electric vehicle 200.

Electric vehicles 200 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The electric vehicles 200 can interface with a surface through at least one wheel, track, propeller, or other interface. The battery pack 210 can also be used as an energy storage system to power a building, such as a residential home or commercial building. Electric vehicles 200 can be fully electric or partially electric (e.g., plug-in hybrid) and further, electric vehicles 200 can be fully autonomous, partially autonomous, or un-crewed. Electric vehicles 200 can also be human operated or non-autonomous. Electric vehicles 200 such as electric trucks or automobiles can include on-board battery packs 210, batteries 215 or battery modules 215, or battery cells 220 to power the electric vehicles 200. The electric vehicle 200 can include a chassis 225 (e.g., a frame, internal frame, or support structure). The chassis 225 can support various components of the electric vehicle 200. The chassis 225 can span a front portion 230 (e.g., a hood or bonnet portion), a body portion 235, and a rear portion 240 (e.g., a trunk, payload, or boot portion) of the electric vehicle 200.

Various zonal controllers 116 can be positioned corresponding to zones of the electric vehicle 200. For example, a front controls zonal controller 116G, corresponding to the front portion 230 can interface with a set of auxiliary components 120 located within, proximal to, or otherwise related to the front portion 230, such as headlights, frunk controls, or windshield wipers. A passenger cabin zonal controller 116H, corresponding to the body portion 235 can interface with a set of auxiliary components 120 located within, proximal to, or otherwise related to the body portion 235. A rear zonal controller 116I, corresponding to the rear portion 240 can interface with a set of auxiliary components 120 located within, proximal to, or otherwise related to the rear portion 240. Such divisions are merely illustrative, and various electric vehicles 200 can include any number of zonal, or other, controllers corresponding to various components of the electrical vehicle 200 (e.g., zones, subsystems, voltage levels, or isolation zones). On or more of the zonal or other controllers can include a first link 132, second link 134, or so forth, to a vehicle control system 130 of the base vehicle 102.

The battery pack 210 can be installed or placed within the electric vehicle 200. For example, the battery pack 210 can be installed on the chassis 225 of the electric vehicle 200 within one or more of the front portion 230, the body portion 235, or the rear portion 240. The battery pack 210 can include or connect with at least one busbar, e.g., a current collector element. For example, the first busbar 245 and the second busbar 250 can include electrically conductive material to connect or otherwise electrically couple the battery 215, the battery modules 215, or the battery cells 220 with other electrical components of the electric vehicle 200 to provide electrical power to various systems or components of the electric vehicle 200. The battery pack 210 can provide energy to any of the zonal controllers 116 or other components of the overlay. For example, either of the base vehicle 102 or overlay can include circuitry to distribute power from the battery to the various components of the overlay.

Figure 3:
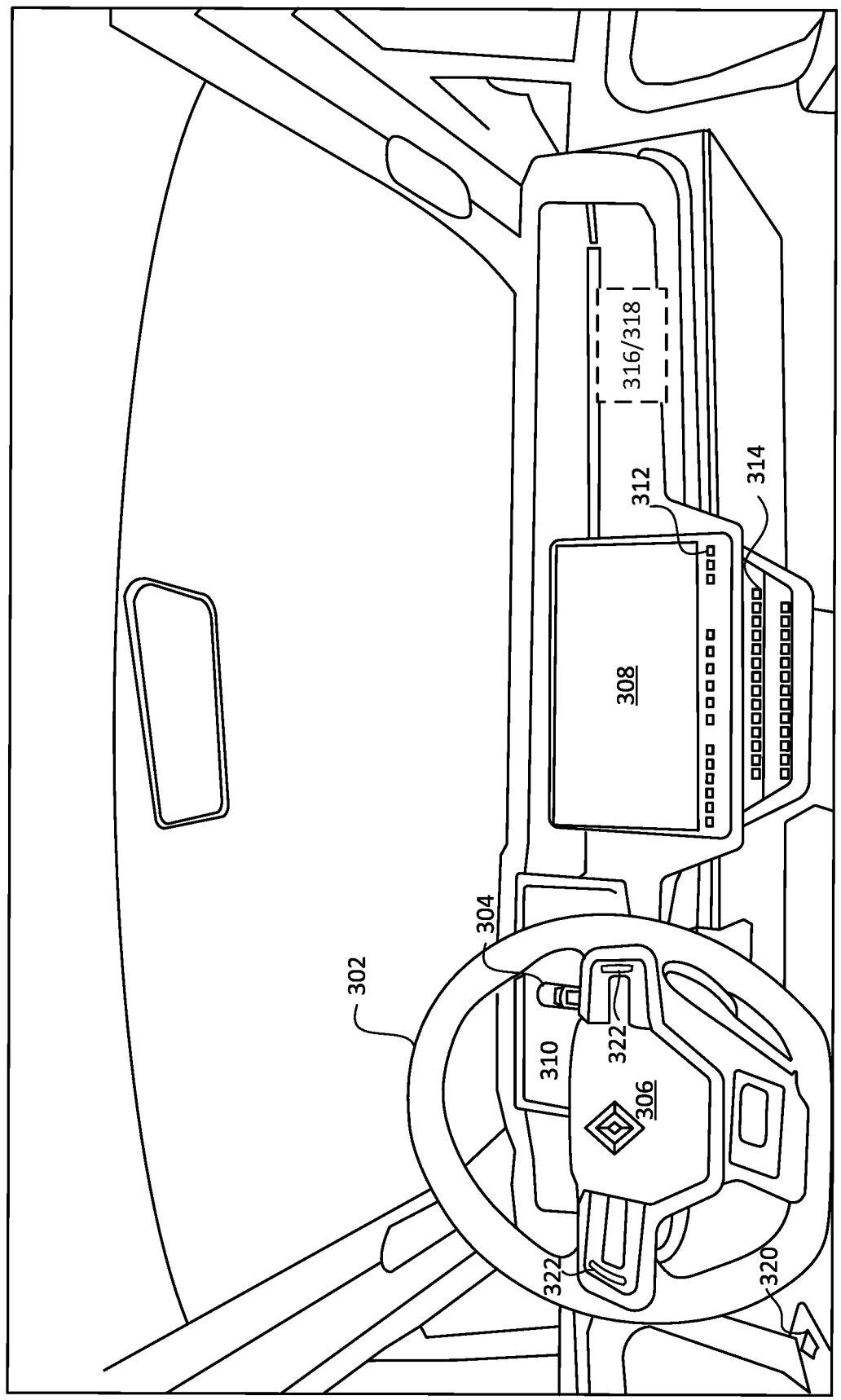
FIG. 3 depicts examples of various components of a user interface corresponding to an overlay.

Referring now to FIG. 3, an example of various components of the user interface 118 is provided. The various components can be disposed in a cabin of the electric vehicle 200, such that the electric vehicle 200 can include the modular control system 104 operatively connected to the base vehicle 102. A steering wheel assembly 302 can include various auxiliary components 120 such as a stalk input element 304 and a horn switch 306. Other auxiliary components 120 of the steering wheel can include roller inputs 322 configured to receive a rotational input, which can correspond to a detected roller position, or an indication of the movement of the roller (e.g., corresponding to a user scrolling through a list presented on the ICD/CID 308/310, or adjusting a volume of an audio device). The roller inputs 322 can receive an axial force when depressed (e.g., corresponding to a user selection). The roller inputs 322 can receive a tilt input, such as a left or right tilt (e.g., corresponding to a menu selection). The auxiliary components 120 can connect to a steering controller 112, or another controller such as a zonal controller 116 (e.g., a front or driver zonal controller 116). User inputs received by the auxiliary components 120 can be conveyed to the, for example, steering controller 112 or zonal controller 116 which may, in turn, cause an indication thereof to be presented via a user interface element such as the CID 308 or ICD 310.

An input, such as an element of a touchscreen 312 of the CID 308 or tactile, capacitive, or mechanical buttons 314, knobs, switches 120I, or other controls of the electric vehicle 200 can receive inputs from a user to control the operation of the electric vehicle 200. For example, the various controllers can receive inputs therefrom, to actuate auxiliary components 120, or convey a signal to other controllers to actuate auxiliary components 120 connected to the other controllers.

Some auxiliary components 120 can interface with other auxiliary components 120. For example, a glovebox disposed in a dashboard assembly, under a seat, or otherwise located can include a glovebox sensor switch 316 to detect a glovebox position. The glovebox sensor switch 316 can connect to a glovebox light 318 (e.g., to illuminate the glovebox when opened). The sensor switch 316 or glovebox light 318 can connect to a zonal controller 116, such as to indicate a status indicative of the glovebox light 318 and the position of the sensor switch 316. Further provided is a window position control 320. The window position control 320 can convey an indication to raise or lower a window to various zonal controllers 116 corresponding to various windows of the electric vehicle 200. One or more of the various zonal controllers 116 can include a saved state indicative of a position of the window (e.g., to avoid actuating a motor to adjust a motor beyond a mechanical limit). That is, the zonal controllers 116 can periodically or upon detecting or causing a change, propagate information to the other controllers corresponding to a state or position of an auxiliary component 120. Further, any change which can be propagated or exchanged can be simulated via a user interface 118 element, such as the display controller 114 for presentation of the CID 308 or ICD 310 (e.g., by a UI design tool).

Figure 4:
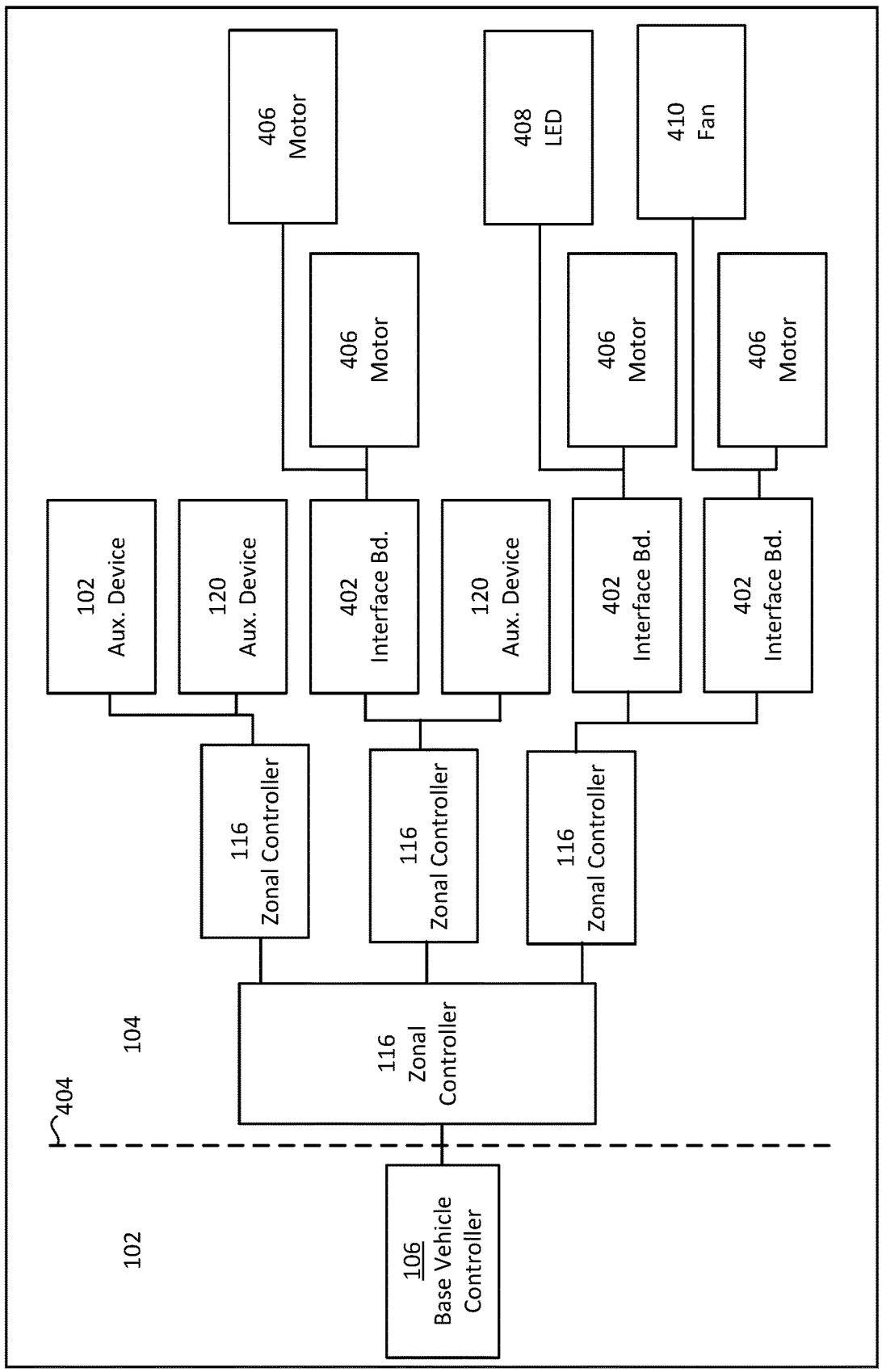
FIG. 4 is an example block diagram of various zonal controllers of the modular control system.

Referring now to FIG. 4, an example block diagram of various zonal controllers 116 of the modular control system 104 is provided, along with various devices connected thereto. For example, some devices are connected with various instances of an interface board 402 or other interface device. Like the other figures provided herein, the depicted figure is an example of an implementation of the present disclosure; various examples can include various network topologies, numbers of zonal controllers 116, auxiliary components 120, and other components of the base vehicle 102 or the overlay.

A first zonal controller 116 connects to a base vehicle controller 106 over a link across an interface 404 bounding the modular control system 104 from the base vehicle 102 portion of the electric vehicle 200. The first zonal controller 116 is connected to a plurality of other zonal controllers 116, which, in turn, are connected to various devices. For example, one of the first zonal controllers 116 connects to a plurality of auxiliary components 120, shown here as two auxiliary components 120 merely for ease of depiction; any number of auxiliary components 120 may connect to a zonal controller 116, according to a number of available ports, logical addresses, drive strength, or other aspects of the zonal controller 116. Another of the zonal controllers 116 connects to various devices via a combination of interface devices, depicted as interface boards 402 and auxiliary components 120. Another of the zonal controllers 116 connects to a various devices connected via one or more interface boards 402.

The interface boards 402 can include circuitry to connect to a portion of auxiliary components 120 which are not configured to directly connect to the zonal controllers 116 (e.g., level shifters, protocol translators, power amplifiers, or port expanders). For example, the interface boards 402 can be of a single common design, or more than one such design. The design can include, for example, circuitry to drive devices in two directions, such as a liftgate, power seat, window, etc. The interface boards 402 can be smaller than a zonal controller 116. Relegation of some functionality to an interface board 402 rather than a zonal controller 116 may reduce a complexity, size, thermal constraint, or otherwise attribute of the zonal controller 116. For example, a port type used infrequently can be implemented on an interface board 402 to maintain a common design of the zonal controller 116. The interface boards 402 or other interface devices can connect to zonal controllers 116 along with other components of the electric vehicle 200, such as a 12V subsystem. For example, the various interface devices can connect to corresponding zonal controllers 116, and can modulate a power input separate from the zonal controllers 116 based on a signal from the zonal controllers 116. The zonal controller 116 can employ a same microcontroller architecture as the interface boards 402, which may reduce complexity or toolsets associated with the modular control system 104. The zonal controller 116 can include a same or greater processing power, memory, or I/O relative to the interface boards 402. For example, the zonal controller 116 can include a Teensy 4.1 control board, and the interface boards 402 can include a Teensy 4.0 control board.

The interface boards 402 can include, for example, wetting current drivers configured to reduce oxidation on some mechanical auxiliary components 120 (e.g., seat switches 120I), dual direction outputs (e.g., configured to drive electric motors 406 of a seat forward and rearward, or electric motors 406 of a windows up and down). The interface board 402 can include analog inputs or other feedback signals, or level translations therefor. The interface board 402 can include high power drivers for headlights or other high-power LED's 408, pulse width modulation (PWM) signal for control of a fan 410 of an HVAC system, or other signals. Such illustrative examples are not intended to be limiting; various particular functionality of a zonal controller 116 or interface board 402 can vary (e.g., be substituted therebetween). Another graphical example is provided hereinafter, at FIG. 8.

Figure 5:
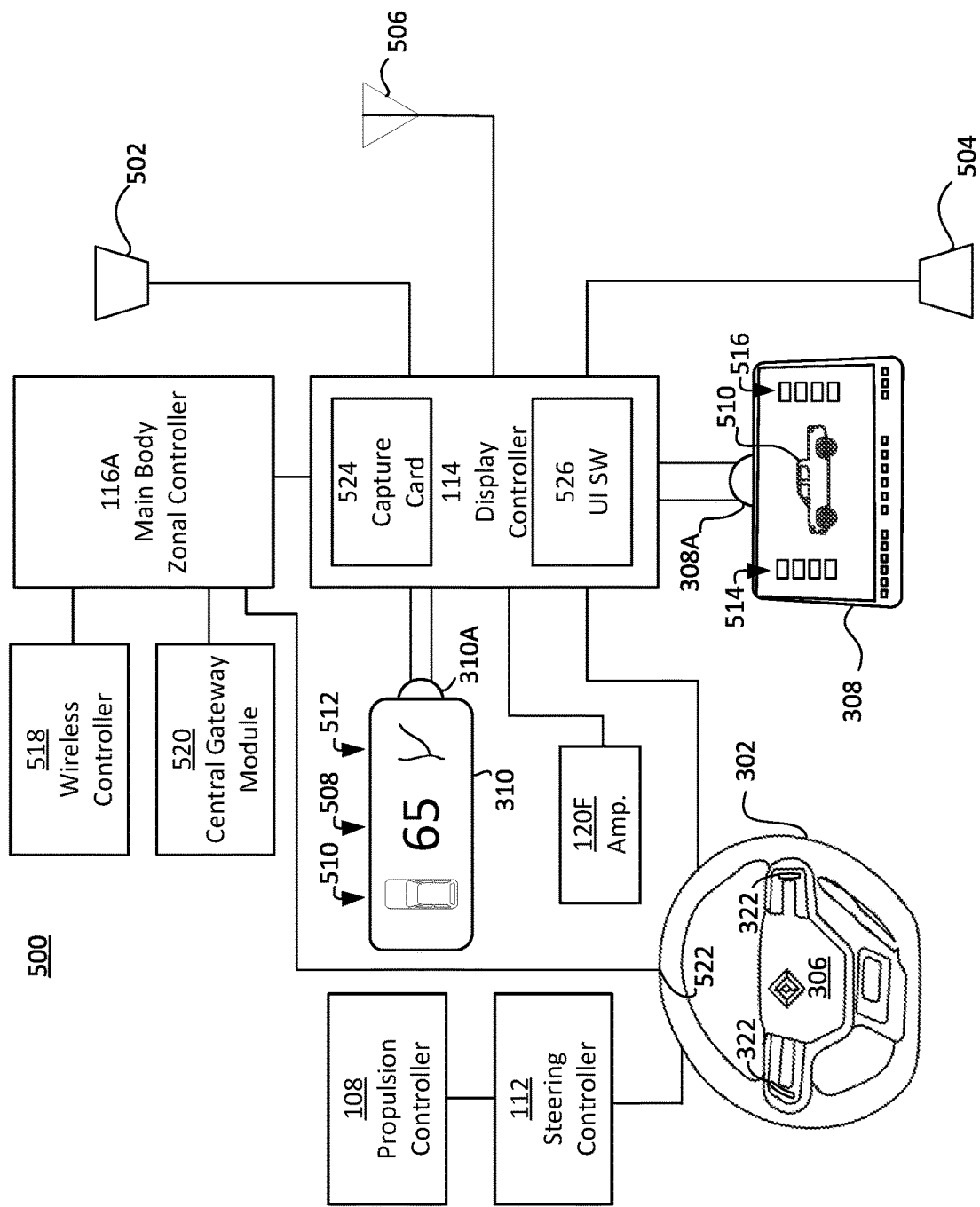
FIG. 5 is example connection diagram of various components of a user interface.

Referring now to FIG. 5, an example connection diagram 500 of various components of the user interface 118 is provided. The connection diagram 500 includes a steering wheel assembly 302 along with various associated controls (auxiliary components 120). The steering wheel assembly 302 (e.g., a steering angle sensor thereof) can connect to the steering controller 112 configured to provide the steering angle to a powertrain controller 108 of the base vehicle 102 portion of an electric vehicle 200, to control the propulsion system of the base vehicle 102 based on the determined steering angle. Such an implementation can reduce changes (if any) implemented to the powertrain controller 108. The steering controller 112 can be or include portions of a steering controller 112 of a base vehicle 102, implement a same signaling protocol, or include a same control hardware, firmware, or so forth, which may be validated as or in combination with a base vehicle 102 component. The steering wheel assembly 302, including the steering angle sensor or other controls thereof can connect to various components of the overlay. For example, a lighting control selection 522 can connect to the main body controller 116A.

The steering wheel assembly 302 connections to the modular control system 104 can include, be routed through, or otherwise be in network communication with a controller such as the depicted display controller 114. The display controller 114 can include a capture card 524 to capture data displayed on the display. The display controller 114 can include instructions configured to display simulated, pre-defined, or real-time data, or combinations thereof over one or more displays. For example, the display controller 114 can include or interface with a UI design tool 526 (e.g., ProtoPie). The display controller 114 can receive inputs from various components of the electric vehicle 200, such as video inputs from a front facing camera 502, or rear facing camera 504. For example, the display controller 114 can include display elements to selectively display one or more video feeds on a display such as the CID 308 or ICD 310, either of which can display information associated with a passenger cabin of a vehicle or a propulsion system 110, such as the propulsion system 110 of the base vehicle 102. For example, the display controller 114 can connect to the CID 308 via one or more connections (e.g., a visual or audiovisual connection, and a data connection, or a single connection including an audiovisual connection and data, such as DisplayPort connecting to a CID board 308A) or ICD 310 (e.g., a visual or audiovisual connection, and a data connection, or a single connection including an audiovisual connection and data, such as display port connecting to an ICD board 310A).

The display can include a rear-view camera responsive to a rearward motion of the electric vehicle 200, a selection of a reverse gear of a transmission, an actuation of a turn signal, or a selection of a manual entry via an input element 514, 516 of a user interface 118. The display can include a live feed from the cameras 502, 504 or a pre-recorded video, such as to demonstrate various use cases, such as an indication of an obstacle behind a vehicle on a rear-view camera upon placing a vehicle into the reverse gear, or another vehicle in a blind spot upon an actuation of a turn signal. The display can include a connection to an audio device 120F such as an amplifier, to cause a provision of audio content (e.g., chimes, music, or noise canceling). The display controller 114 can connect to a main body zonal controller 116A, which connects to a controller of the base vehicle 102 such as a central gateway module 520 which can convey information between the display controller 114 and the base vehicle 102. The display controller 114 can connect to a wireless controller 518, which can receive data (e.g., music) for presentation, via the display, or can interface with various other auxiliary components 120 such as mobile devices, key fobs, tents, roof storage boxes, light bars, or bike racks.

The display controller 114 can cause an indication of various simulated or measured data on the ICD 310. For example, a depiction of a state of a vehicle 510 can correspond to one or more inputs from various auxiliary components 120, such as ajar doors, opened charging ports, or headlight statuses. The input elements 514, 516 can generate outputs to cause an actuation of such auxiliary components 120 (e.g., opening or closing the charging port or engaging or disengaging headlights). Such triggers (e.g., inputs and outputs) can propagate through one or more other controllers such as various zonal controllers 116. The display controller 114 can provide a display of other data such as a detected or simulated speed 508, or a navigation of the electric vehicle 200 over a navigation map 512. The simulated data can depict vehicle operation different from a detected state of the base vehicle 102. Thus, a stationary occupant at an auto show, or a design laboratory environment can observe an operation of the navigation map 512. A position of the vehicle can be based on any of a GNSS antennae 506 of the electric vehicle 200 or a facsimile thereof (e.g., a serial data steam according to a national marine electronics associated (NMEA) defined protocol) simulating a vehicle traversing a route.

Referring now to FIG. 6, an example lookup table (LUT) 600 for vehicle control is provided. The depicted LUT 600 is an illustrative example of a data structure. Such data structures can include any number of instances of the data elements, and variants thereof can be instantiated at any number of controllers of a modular control system 104 (e.g., display controllers 114, or zonal controllers 116). Some data structures can include further data elements such as recordations of positions of seat motors 406, window motors 406, timers, timed gradients for dimming transitions of lights, or so forth.

A first column 602 of the LUT 600 can include various devices communicatively connected to a device hosting the LUT 600. The first column 602 can extend to rows 604 corresponding to various signals. For example, the LUT 600 may be hosted on a zonal controller 116 and can be connected to any number of auxiliary components 120, other zonal controllers 116, or display controllers 114. A first row 606 can correspond to an auxiliary component 120 including a normally open switch that engages hazard indicators when closed. When the controller hosting the LUT 600 receives an indication of an open hazard switch, the controller can take no action. When the controller hosting the LUT 600 receives an indication of a closed hazard switch, the controller takes an action to engage hazard indicators. Such an action can be implemented by communicating a message to one or more other controllers connected to a hazard/turn signal lamp to engage the lamp, or provide an output to another auxiliary component 120. For example, where the controller hosting the LUT 600 is a zonal controller 116 for a rear right zone of an electric vehicle 200, the hosting controller can actuate a rear right indicator lamp, and convey a message to a hub zonal controller 116. The hub zonal controller 116 can include a LUT 600 mapping to further zonal controllers 116 corresponding to, respectively, a rear left zone; a front right zone; and a front left zone of the electric vehicle 200, each of which can actuate a corresponding indicator lamp.

The LUT 600 can include second row 608 corresponding to another zonal controller 116. For example, a message corresponding to a variable brightness light can be indicated by a first portion of a message (e.g., an upper nibble, 0001). Another portion of the message (e.g., a bottom nibble, XXXX) can include an indication of a brightness level (e.g., a binary indication mapping to a current level, duty cycle of a PWM signal, or so forth). Another message from the other zonal controller 116 can include an indication to forward a message to a further controller still, such as a message sent to a hub, or between other controllers of a mesh or extended star topology. For example, the message can include a first portion indicating a command to forward the message, a second portion indicating an address of a recipient. The message can further include a content portion, for receipt by the addressed controller.

The LUT 600 can include a third row 610 corresponding to another controller, such as a display controller 114. The message can include, for example, the forwarding instruction, and a vehicle mode instruction. The vehicle mode instruction can originate at various controllers, such as a display controller 114, which may receive the command through a graphical user interface 118. For example, the command may be received in combination with a credential such as a password, so that an occupant may not erroneously change a mode (e.g., during an auto show, to cause an engagement of a drive unit 126). The message can be conveyed to a controller (e.g., a zonal controller 116) connected to a base vehicle 102. Such a zonal controller 116 can locally store an indication of the mode (e.g., according to a state machine) and implement the mode, or convey the indication to another controller of the base vehicle 102 or modular control system 104 to implement the mode.

Although the depicted LUT 600 includes two dimensions, some LUTs 600 or other data structures can include any number of dimensions, such that various interconnection or commands can be arrayed into the table structure, or another structure may be employed (e.g., a relational database). For example, a third dimension can include one or more recipients to be addressed responsive to a received message. Various zonal or other controller can include corresponding data structures, such that the various controller of an electric vehicle 200 can route messages between the various controller or other vehicle components.

Figure 7:
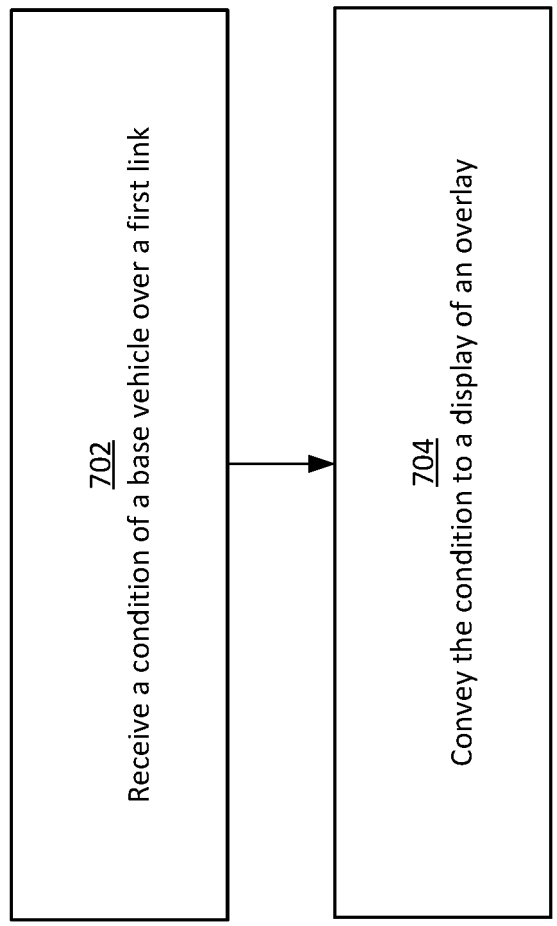
FIG. 7 is a flow diagram for an example method of vehicle control.

Referring now to FIG. 7, an example flow diagram for a method 700 of vehicle control is provided. The method 700 can be performed by one or more systems or components depicted in FIG. 1-5, or 8 including the system 100 of FIG. 1 or a modular control system 104. For example, the method 700 can be performed by one or more controllers of an electric vehicle 200, having a memory device communicatively coupled thereto. At ACT 702, a controller of a modular control system 104 connected to a vehicle control system 130 via a first link (e.g., a first zonal controller 116) receives a first trigger indicative of a condition of the base vehicle. A condition can refer to or include any status information associated with a component. The trigger can be an input generated by or based on a controller of the base vehicle 102. The trigger can be generated at the main body controller based on data scraped, intercepted, or otherwise received over the first link. For example, the main body controller can be a zonal controller 116 connected to a plurality of other zonal controllers 116 and a display controller 114, along with a base vehicle controller 106.

At ACT 704, the main body controller can convey the condition to a display. For example, the main body controller can convey the condition via a display controller 114 for output to the display. The output of the condition to the display can include a graphical user interface or another display. For example, the output can be or include an actuation of a chime corresponding to a propulsion system operability status (e.g., based on a low battery SoC).

Figure 8:
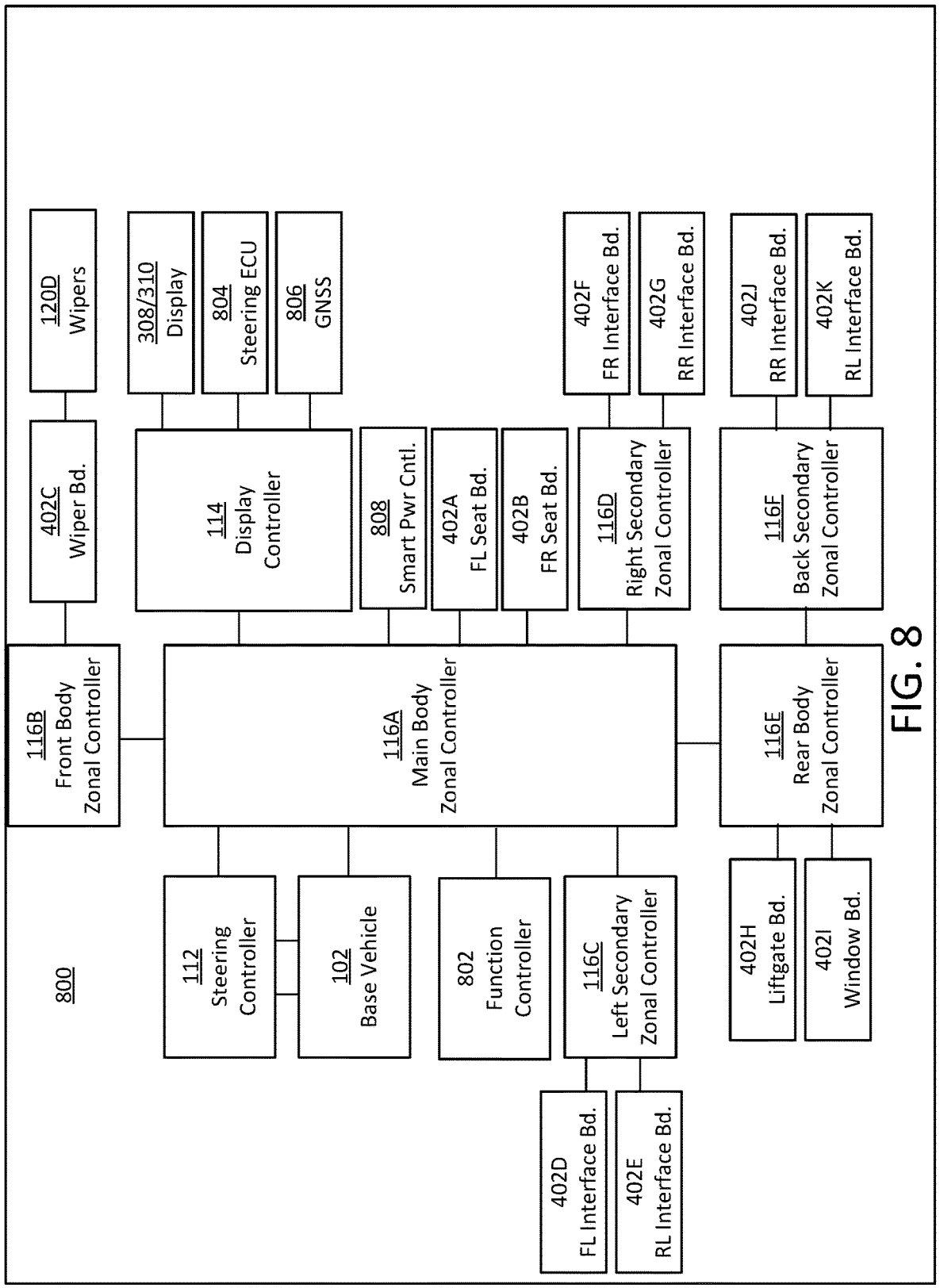
FIG. 8 is an example block diagram of various zonal controllers of the modular control system.

Referring now to FIG. 8, an example block diagram 800 of various zonal controllers 116 of the modular control system 104 is provided. The depicted view provides a connection diagram centered on the main body zonal controller 116A, shown as larger than other devices of the block diagram 800, merely for ease of depiction. Indeed, the depicted zonal controllers 116 can include a same hardware, firmware, or so forth. The main body zonal controller 116A is in network communication with a base vehicle 102. The communicative connection between the zonal controller 116 and the base vehicle 102 can include a network connection such as one or more CAN busses. The base vehicle 102 (e.g., a powertrain controller 108 thereof) can further connect to a steering controller 112 via a same or different network as the main body zonal controller 116A (e.g., a CAN, LIN, or Ethernet network). For example, the steering controller 112 can be a same steering controller 112 as in a base vehicle 102 lacking an overlay portion, such that the communication interfaces between the base vehicle 102 and the steering controller 112 can be or include a same interface as in the base vehicle 102. The steering controller 112 can interface with the main body zonal controller 116A via a GPIO connection, such that the steering controller 112 can operate as an auxiliary component 120 relative to the connected main body zonal controller 116A.

The main body zonal controller 116A can connect to various further elements. For example, the main body zonal controller 116A can connect to a functional controller 802, such as a wireless controller for Wi-Fi, Bluetooth, Cellular, near field communications (NFC) (e.g., the wireless controller 518 of FIG. 5). The main body zonal controller 116A can directly connect to various auxiliary components 120 (not depicted), or via an interface board 402. For example, an interface board 402 pair connected to the main body zonal controller 116A can include a front left seat interface board 402A and a front right seat interface board 402B, which can correspond to various controls or outputs associated with a left front and right front seat (e.g., heated seats or reclining adjustments).

The main body zonal controller 116A includes a connection to a display controller 114. The connection to the display controller 114 and the various other zonal controllers 116 can include a serial connection such as a UART or Ethernet. The display controller 114 can connect to various displays over a display standard such as HDMI, DisplayPort, or an LVDS output for a display board of the display. The connection can include data passed between, for example, a button or touchscreen of the display, or can include only display data (e.g., via a display board). The display controller 114 can interface with a steering controller 804 to receive information from the various steering inputs (e.g., horn switches, roller inputs 322, or the like). The display controller 114 can interface with a simulated or real GNSS source 806, such as a GPS receiver. The display controller 114 can interface with a smart power controller 808 to control a distribution of power between various overlay elements.

The main body zonal controller 116A can connect to a front body zonal controller 116B. The front body zonal controller 116B, in turn, can connect to an interface board 402 connected to an auxiliary component 120, such as wiper interface board 402C coupled to the wiper motor 120D. The main body zonal controller 116A further connects to another pair of zonal controllers 116C, 116D (a left secondary zonal controller 116C and right secondary zonal controller 116D). The connected secondary zonal controllers 116 can connect to further interface boards 402 to connect to various auxiliary components 120 associated with a zone thereof. For example, the left secondary zonal controller 116C can connect to a front-left interface board 402D and rear-left interface board 402E; the right secondary zonal controller 116D can connect to a front-right interface board 402F and rear-right interface board 402G.

As depicted, some zonal controllers 116 can include chained connections (e.g., extended star topologies). For example, a rear body zonal controller 116E is connected to the main body zonal controller 116A. The rear body zonal controller 116E is coupled to a pair of interface boards 402 to control auxiliary components 120 associated with a rear portion of a vehicle, such as a liftgate interface board 402H or window interface board 402I). A back secondary zonal controller 116F is connected to the rear body zonal controller 116E. The back secondary zonal controller 116F can couple with further interface boards still to control various auxiliary components 120 disposed in a rear portion of a vehicle, such as a right rear zone interface board 402J and a left rear zone interface board 402K.

Figure 9:
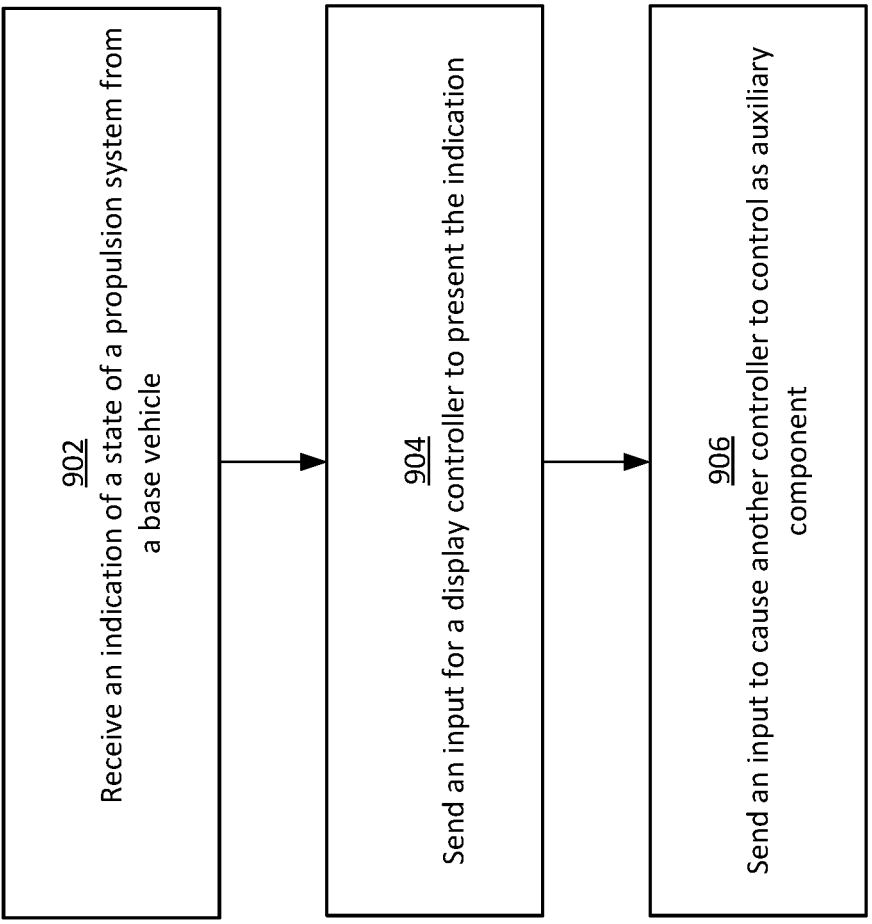
FIG. 9 is a flow diagram for an example method of vehicle control.

Referring now to FIG. 9, an example flow diagram for a method 900 of vehicle control is provided. The method 900 can be performed by one or more systems or components depicted in FIG. 1-5, or 8 including the system 100 of FIG. 1 or a modular control system 104. For example, the method 900 can be performed by a zonal controller 116 of an electric vehicle 200, having a memory device communicatively coupled thereto. At ACT 902, a first controller (e.g., a first zonal controller 116) receives an indication of a state of a propulsion system 110 from a base vehicle 102. The state can include a status, condition, speed, mode, or other information relevant to the propulsion system. The first controller can receive the indication from any controller of the base vehicle 102. For example, the first controller can scrape the information from a CAN bus of the propulsion system 110.

At ACT 904, the first controller sends an input for a display controller 114 to present the indication. For example, the input can be based on the receipt of the indication, and can be configured to cause the display controller to provide an output to the display. For example, the display can provide an output of a power limit associated with a drive unit 126, and can provide an indication of the drive unit 126, or another auxiliary component such as an audible chime. At ACT 906, the first controller can send an input to another controller to cause the other controller to control the auxiliary component 120. That is, the first controller can cause a control of an auxiliary component 120 such as the chime, by another (e.g., intermediating) controller.

Figure 10:
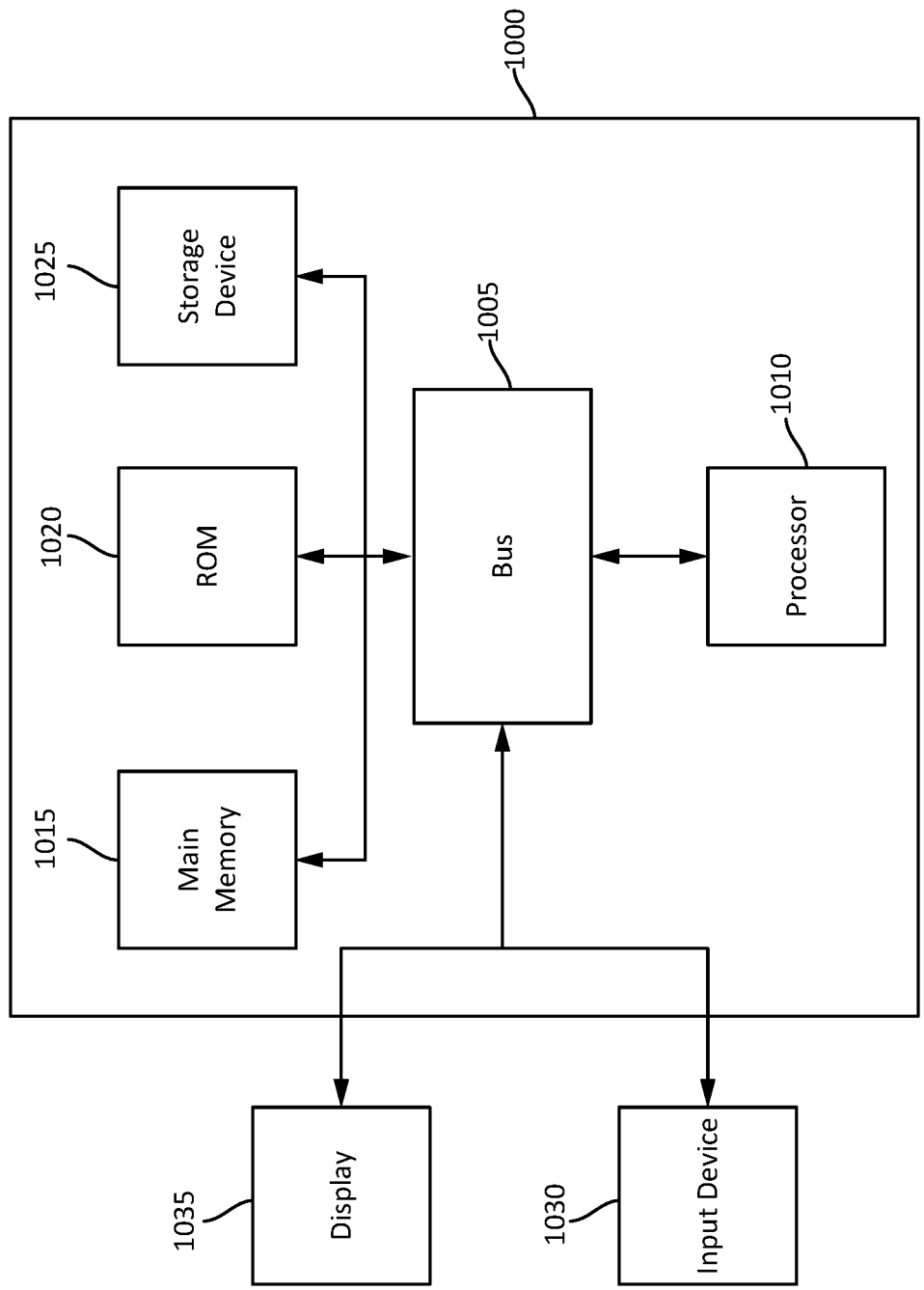
FIG. 10 is a block diagram illustrating an architecture for a computer system that can be employed to implement elements of the systems and methods described and illustrated herein.

FIG. 10 is a block diagram illustrating an architecture for a computer system that can be employed to implement elements of the systems and methods described and illustrated herein. The computing system 1000 includes at least one bus 1005 or other communication component for communicating information and at least one processor 1010 or processing circuit coupled to the bus 1005 for processing information. The computing system 1000 can also include one or more processors 1010 or processing circuits coupled to the bus for processing information. The computing system 1000 also includes at least one main memory 1015, such as a random-access memory (RAM) or other dynamic storage device, coupled to the bus 1005 for storing information, and instructions to be executed by the processor 1010. The main memory 1015 can be used for storing information during execution of instructions by the processor 1010. The computing system 1000 can include at least one read only memory (ROM) 1020 or other static storage device coupled to the bus 1005 for storing static information and instructions for the processor 1010. A storage device 1025, such as a solid-state device, magnetic disk or optical disk, can be coupled to the bus 1005 to persistently store information and instructions.

The computing system 1000 can be coupled via the bus 1005 to a display 1035, such as a liquid crystal display, or active-matrix display, for displaying information to a user such as a driver of the electric vehicle 200 or other end user. An input device 1030, such as a keyboard or voice interface can be coupled to the bus 1005 for communicating information and commands to the processor 1010. The input device 1030 can include a touch screen display 1035. The input device 1030 can also include a cursor control, such as a mouse, a trackball, or cursor direction keys, for communicating direction information and command selections to the processor 1010 and for controlling cursor movement on the display 1035.

The processes, systems and methods described herein can be implemented by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes described herein. One or more processors in a multi-processing arrangement may also be employed to execute the instructions contained in main memory 1015. Hard-wired circuitry can be used in place of or in combination with software instructions together with the systems and methods described herein. Systems and methods described herein are not limited to any specific combination of hardware circuitry and software.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer-based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
   a modular control system configured to connect with a vehicle control system of a base vehicle, the modular control system comprising:
   a main body controller connected, via a first link, with the vehicle control system;
   a plurality of additional controllers coupled with the main body controller, wherein the main body controller is configured to act as a gateway between the modular control system and a base vehicle controller of the vehicle control system, wherein the base vehicle controller is configured to act as a gateway between the base vehicle controller and a plurality of additional controllers of the vehicle control system;
   a steering controller connected, via a second link, with one of the plurality of additional controllers of the vehicle control system, the steering controller to convey, via the second link, an indication of a steering angle to the one of the plurality of additional controllers of the vehicle control system; and
   a display controller connected with the main body controller, the main body controller to:
   receive a first trigger, over the first link, indicative of a condition of the base vehicle; and
   convey, via the display controller, an output of the condition to a display.

2. The system of claim 1, further comprising:
   the plurality of additional controllers coupled with the main body controller configured to control a corresponding plurality of auxiliary components associated with corresponding vehicle zones.

3. The system of claim 1, comprising, each of the plurality of additional controllers coupled with the main body controller to control an auxiliary component associated with the base vehicle, the plurality of additional controllers and the main body controller comprising a same hardware circuit.

4. The system of claim 1, further comprising:
   the plurality of additional controllers coupled with the main body controller configured to control a corresponding plurality of auxiliary components associated with corresponding vehicle zones,
   the main body controller configured to:
   receive a second trigger from a first of the plurality of additional controllers coupled with the main body controller, the second trigger associated with a first auxiliary component; and
   provide the second trigger to a second of the plurality of additional controllers coupled with the main body controller, to control a second auxiliary component responsive to the second trigger, the first auxiliary component to generate a second output corresponding to an input of the second auxiliary component according to a lookup table of the main body controller.

5. The system of claim 4, further comprising:
   the main body controller to convey the second trigger to the display controller for display.

6. The system of claim 1, comprising the display to include:
   a center information display (CID) configured to present information associated with a passenger cabin of the base vehicle; and
   an instrument cluster display (ICD) configured to present information associated with a propulsion system of the base vehicle.

7. The system of claim 6, comprising:
   the display controller to present simulated data on the display, responsive to an output of an auxiliary component.

8. The system of claim 1, comprising the main body controller to:
   receive an input from a first auxiliary component; and
   generate a second output for a second auxiliary component, based on the input.

9. The system of claim 1, further comprising:
   a plurality of instances of an interface device connected to the plurality of additional controllers coupled with the main body controller, the plurality of instances of the interface device configured to modulate power from an input source based on a signal from any of the plurality of additional controllers coupled with the main body controller.

10. The system of claim 1, comprising the main body controller to facilitate control of an auxiliary component, the auxiliary component comprising at least one of a mechanical switch, a powered port, a windshield wiper, a seat control, an indicator lamp, an audio device, a user interface element, or a sensor for a closure.

11. The system of claim 1, wherein the first link is a point-to-point link between the main body controller and the base vehicle controller.

12. A method, comprising:
 establishing, by a main body controller, communication with a plurality of additional controllers of a modular control system, wherein the main body controller is configured to act as a gateway between the modular control system and a base vehicle controller of a vehicle control system;
 establishing, by the main body controller, communication over a first link with the base vehicle controller, wherein the base vehicle controller is configured to act as a gateway between the base vehicle controller and a plurality of additional controllers of the vehicle control system;
 providing, by the main body controller, an output to adjust a condition of a base vehicle to the base vehicle controller over the first link;
 receiving, via the first link by the main body controller of the modular control system configured to connect to the vehicle control system of the base vehicle, a first trigger indicative of the adjusted condition of the base vehicle; and
 conveying, by the main body controller via a display controller of the modular control system, an output of the condition to a display.

13. The method of claim 12, comprising:
 controlling, by the plurality of additional controllers of the modular control system connected to the main body controller, a corresponding plurality of auxiliary components, the plurality of auxiliary components associated with vehicle zones.

14. The method of claim 12, comprising the display to include:
 a center information display (CID) configured to present information associated with a passenger cabin; and
 an instrument cluster display (ICD) configured to present information associated with a propulsion system.

15. An electric vehicle, comprising:
 a modular control system configured to connect with a vehicle control system of a base vehicle, the modular control system comprising:
  a main body controller connected, via a first link, with the vehicle control system;
  a plurality of additional controllers coupled with the main body controller, wherein the main body controller is configured to act as a gateway between the modular control system and a base vehicle controller of the vehicle control system, wherein the base vehicle controller is configured to act as a gateway between the base vehicle controller and a plurality of additional controllers of the vehicle control system;
  a steering controller connected, via a second link, with one of the plurality of additional controllers of the vehicle control system, the steering controller to convey, via the second link, an indication of a steering angle to the one of the plurality of additional controllers of the vehicle control system; and
  a display controller connected with the main body controller, the main body controller to:
   receive a first trigger, over the first link, indicative of a condition of the base vehicle; and
   convey, via the display controller, an output of the condition to a display.

16. The electric vehicle of claim 15, comprising:
 the plurality of addition controllers coupled with the main body controller configured to control a corresponding plurality of auxiliary components associated with corresponding vehicle zones.

17. The electric vehicle of claim 15, comprising the display to include:
 a center information display (CID) configured to present information associated with a passenger cabin; and
 an instrument cluster display (ICD) configured to present information associated with a propulsion system.

18. The electric vehicle of claim 15, comprising:
 the display controller to present simulated data on the display, responsive to a second output of an auxiliary component.

19. The electric vehicle of claim 15, wherein the first link is a point-to-point link between the main body controller and the base vehicle controller.

* * * * *